United States Patent [19]

David et al.

[11] Patent Number: 4,606,040

[45] Date of Patent: Aug. 12, 1986

[54] TRANSMITTING-RECEIVING STATION FOR A SYSTEM FOR TRANSMITTING DATA BY FREQUENCY HOPPING

[75] Inventors: Guy A. J. David, Thiais; Jean-Pierre H. Van Uffelen, Chevilly Larue; Jean-Pierre M. Defeuilly, Cressely, all of France

[73] Assignee: U.S. Philips Corporation, New York, N.Y.

[21] Appl. No.: 652,551

[22] Filed: Sep. 20, 1984

[30] Foreign Application Priority Data

Sep. 30, 1983 [FR]  France ................................ 83 15611

[51] Int. Cl.⁴ ...................... H04B 14/02; H04B 15/00
[52] U.S. Cl. ........................................ 375/1; 375/2.2; 375/114; 455/32; 455/65
[58] Field of Search ...................... 375/1, 2.1, 2.2, 115, 375/114, 116; 455/26, 27, 29, 32, 62, 65; 370/18, 92; 178/22.01

[56] References Cited

U.S. PATENT DOCUMENTS

| | | | |
|---|---|---|---|
| 4,383,323 | 5/1983 | Timor | 455/32 |
| 4,434,504 | 2/1984 | Fredrickson | 455/32 |
| 4,538,281 | 8/1985 | Rajan | 375/1 |
| 4,558,453 | 12/1985 | Mimken | 375/1 |

*Primary Examiner*—Benedict V. Safourek
*Attorney, Agent, or Firm*—David R. Treacy

[57] ABSTRACT

A transmitting-receiving station for transmitting information by frequency hopping comprises a code generator to define the use of a plurality of channels in accordance with a high-speed skip law for a transmitting-receiving station in the stand-by mode, the high-speed skip law consisting in the use of each of the channels during a period of time $T_p$, while the low-speed skip law governs the change of listening channels used during $N \times T_p$, each corresponding to a center channel out of a sequence of N channels of the high-speed skip law. The center channel contains a synchronizing code. The station comprises a memory device to which a write circuit for progressively storing therein the codes produced by the generator and also to which a read circuit is connected to take the codes from the memory as a function of the positions of the transmitting-receiving station.

6 Claims, 10 Drawing Figures

FIG.4

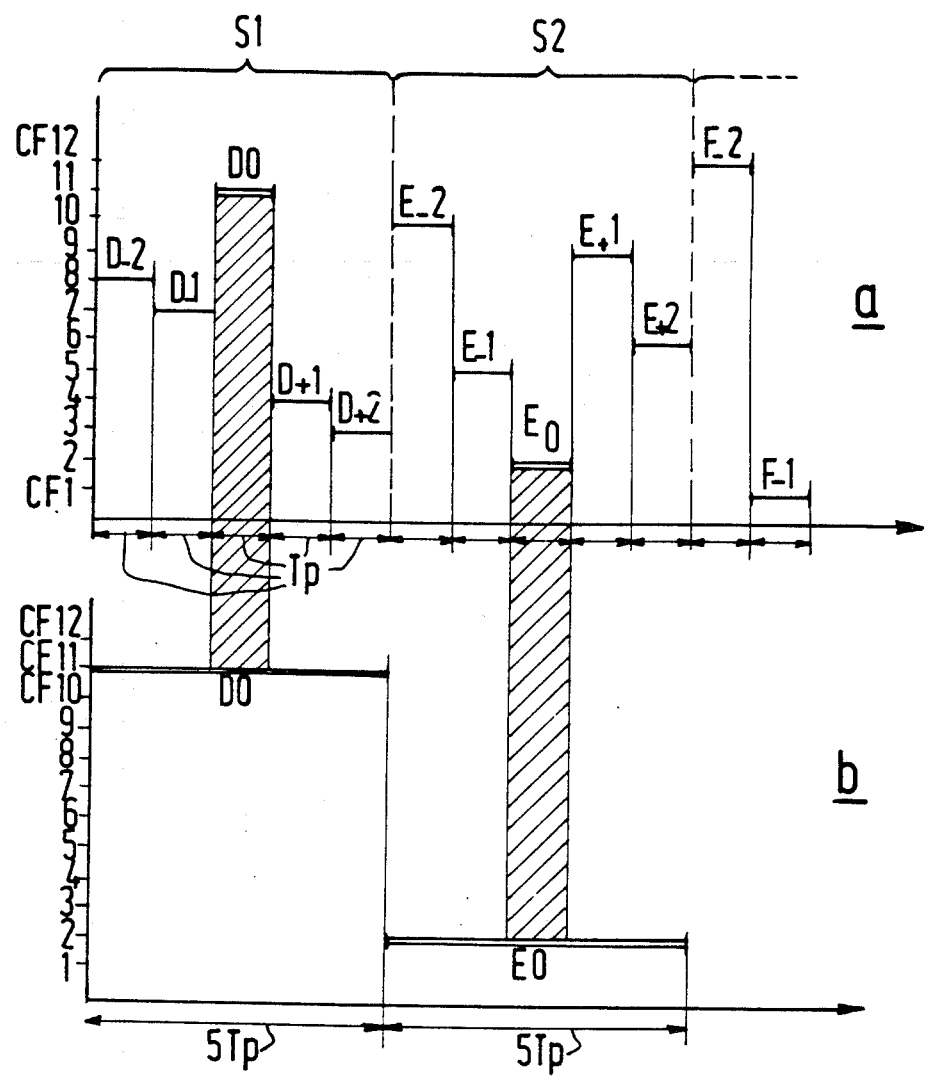
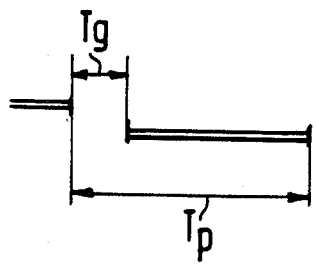
FIG.1
FIG.2

TRANSMITTING-RECEIVING STATION FOR A SYSTEM FOR TRANSMITTING DATA BY FREQUENCY HOPPING

The invention relates to a transmitting-receiving station for a system of transmitting data by frequency hopping, comprising a code generator for defining the use of a plurality of channels in accordance with a so-called high-speed skip law for a transmitting-receiving station in the transmitting mode or in the receiving mode and in accordance with a so-called low-speed skip law for a transmitting-receiving station in the stand-by mode, the high-speed skip law consisting in the use of each of the channels during a time $T_p$, while the low-speed skip law governs the changes of the listening channels employed during $N \times T_p$, each corresponding to a centre channel of a sequence of N channels of said high-speed skip law, this centre channel being designed to contain a synchronizing code.

The transmission of data by frequency hopping is particularly used when one wants to transmit secret messages in a fool-proof manner while avoiding possible scrambling by malicious third parties. This wish can be fulfilled better according as said high-speed skip law is more complicated, that is to say the longer the sequence of the codes processed by the code generator and the higher the number of frequency channels. This may cause difficulties, since before a transmission can take place it is necessary that there be agreement between the channel used at the transmitting side and the listening channel at the receiver side. A first measure taken to eliminate this difficulty is a non-recurrent setting of all the code generators. These adjusted generators then remain continuously operative. It will be obvious that this initial setting is not sufficient to ensure said agreement, since on the one hand an inevitable drift of the generators will occur in the course of time and on the other hand the propagation times between the different transmitting-receiving stations are different; thus it may even happen that there is no agreement between the channels at the transmitting and the receiving ends. A second measure to ensure that a transmitting-receiving station is capable of synchronizing itself with a transmission consists in governing the change of its listening channels in accordance with the low-speed skip law mentioned in the foregoing. The time shift of the generators at the transmitting and at the receiving ends may then reach $$\pm \frac{(N-1)T_p}{2}$$

to provide that it is still possible to receive the synchronizing code transmitted in the centre channel of the arrangement.

When the synchronizing code is received by a transmitting-receiving station in the stand-by mode, a first requirement is imposed: the change from the low-speed skip law to the high-speed skip law must be effected as rapidly as possible in order to facilitate the traffic. To ensure that the synchronizing code is properly received by the transmitting-receiving station in the stand-by mode a second requirement is imposed at the transmission side, namely that the first channel of the high-speed skip law employed by a station which changes from the stand-by mode to the transmitting mode must be the channel which would be used by this same station in the transmitting mode from the moment of the setting operation mentioned in the foregoing.

The present invention provides a transmitting-receiving station of the type described in the foregoing which satisfies these two requirements.

For that purpose such a station comprises a memory device to which a write circuit for progressively storing therein the codes received from the generator and also a read circuit for reading the codes from the memory as a function of the position to which the transmitting-receiving station is adjusted are connected.

The following description which is given by way of non-limitative example with reference to the accompanying drawings will make it better understood how the invention can be put into effect.

FIG. 1 is a circuit diagram illustrating the use of the channels according to said laws: the high-speed skip and the low-speed skip laws.

FIG. 2 shows the presence of a waiting time $T_g$ between each channel change.

The transmission systems transmitting by means of frequency hopping use a plurality of frequency channels; these channels are denoted by CF1 to CF12 in FIG. 1. Each of these channels is used during a period of time Tp in accordance with a so-called high-speed skip law, thus, in FIG. 1a, the channels CF8, CF7, CF11, CF4, CF3, CF10, CF5, CF2, CF9, CF6, CR12, CR2 . . . are used sequentially. From this high-speed skip law a low-speed skip law is derived. For this example a sequence of five channels S1, S2, . . . is taken. In each of these sequences a centre channel is taken: CF11 for S1, CF2 for S2 . . . The low-speed skip law consists in employing these centre channels during a period of time 5 Tp as shown in FIG. 1b. The centre channel of the high-speed skip law corresponds to the middle of the low-speed skip law channel.

It should be noted that the change in channel is not effected instantaneously; a waiting time Tg is introduced before the channel is actually used after a change in channel (see FIG. 2).

Figure 3:
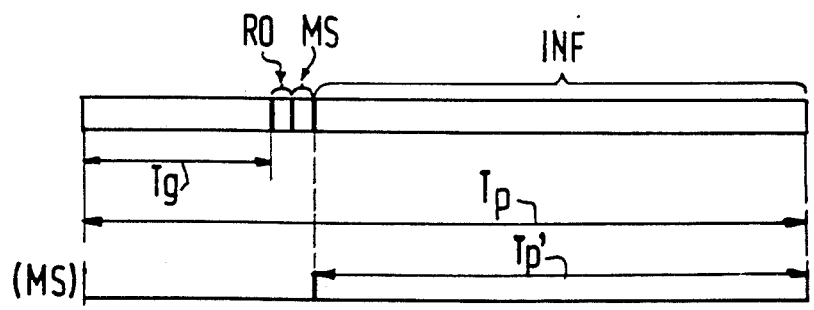
FIG. 3 shows the distribution of the information components transmitted via each channel.

FIG. 3 shows the distribution of the binary elements transmitted through a central channel during the period Tp. After the waiting time Tg has elapsed, a sequence R0 of alternately binary "1" and "0" is transmitted to facilitate synchronization of the clock with the frequency at which the binary elements appear; after this sequence the synchronizing code word MS is transmitted and thereafter during the remaining period of the time the useful binary information: INF.

Figure 4:
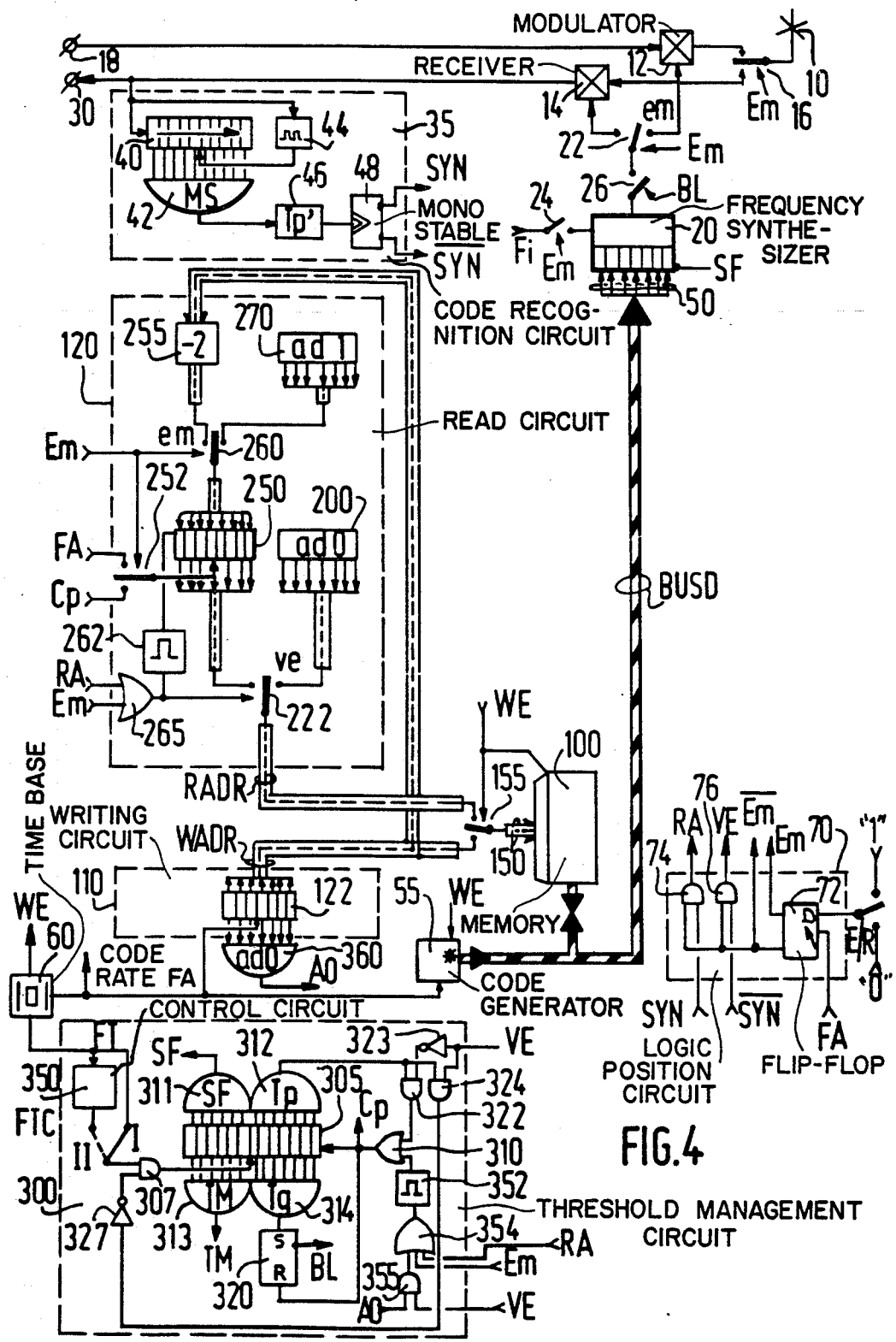
FIG. 4 shows a transmitting-receiving station according to the invention.

FIG. 4 shows a transmitting-receiving station according to the invention. An aerial 10 is used for both transmission and reception. Consequently this aerial is connected either to the output of a transmission modulator 12 or the input of a receiver 14, the choice being determined by the position of a change-over switch 16. By means of the modulator 12 it is possible to transmit the data present at a terminal 18 via a channel whose frequency is determined by a frequency synthesizer 20. This frequency synthesizer is also used by the receiver 14 to fix the frequency of the first local oscillator. This frequency is shifted with respect to the transmitting frequency through a value equal to the value of the intermediate frequency Fi. A change-over switch 22 renders it possible to apply the output frequency of the synthesizer 20 either to the transmission modulator 12 or to the receiver 14. When the synthesizer 20 is connected to the receiver 14 a switch 24 is provided to shift the value of the output frequency of the synthesizer 20 through Fi. A blocking control switch 26 renders it possible to cancel the output signal of the synthesizer 20 during the waiting period Tg.

The user can process the data supplied by the receiver 14, using a terminal 30. A synchronizing code recognizing circuit 35 is connected to this terminal. This circuit is formed by a shift register 40 to which a decoder 42 is connected. This register is filled with data received from the output of receiver 14 at the rate of a synchronized clock 44, more specifically by means of the sequence R0, at the rate at which the binary elements appear. When the code MS is registered in its totality in the register 40 it is then recognized by the decoder 42, which produces an active signal (see line (MS) in FIG. 3). This active signal is delayed by a period Tp' with the aid of a delay circuit 46 before it is applied to the trigger input of a retriggerable monostable circuit 48. This time Tp' corresponds to the end of channel usage. The period in which the monostable circuit 48 changes state is somewhat longer than the period in which the signal MS appears so that at the output of the circuit 48 a logic signal SYN appears which assumes the logic value "1" at the end of usage of a channel which has transmitted the code MS. The signal SYN remains at this logic "1" level as long as this code is regularly received.

The synthesizer 20 has a code input 50. The code present at this input must be validated by the position of a signal SF to enable determination of the frequency of the output signal of this synthesizer 20. These codes are supplied by a code generator 55 which is, for example, of a pseudo-random sequence type. The rate at which these codes appear is determined by a signal FA, which is processed by means of a quartz time base 60; at each ascending edge of the signal FA a new code appears at the output of the generator 55 during a period of time determined by a short pulse of a signal WE. Outside this period the output of the generator has a high impedance.

It should be noted that the generators comprised in all the transmitting-receiving stations which are part of the same system of transmission by means of frequency hopping are started at the same time and are thereafter permanently maintained in the operating state.

Consequently the codes of this generator 55 define the channels; the following codes can be distinguished:
the codes D0. E0. F0 ... which determine the central channels
the codes $D_{-2}, D_{-1}; E_{-2}, E_{-1}; F_{-2}, F_{-1}; \ldots$ which determine the preceding channels;
the codes $D_{+1}, D_{+2}; E_{+1}, E_{+2}; \ldots$ which determine the subsequent channels.

Thus, the generator 55 sequentially produces, as shown in FIG. 1a, the codes ... $D_{-2}, D_{-1}, D0, D_{+1}, D_{+2}, E_{-2}, E_{-1}, E0, E_{+1}, E_{+2}, F_{-2}, F_{-1}, \ldots$ For a station in the stand-by mode which is consequently governed by the low-speed skip law, the codes ... D0, E0, ... are the codes which fix the control channels during 5 Tp.

A logic position circuit denoted by reference numeral 70 produces different signals which define the different positions the transmitting-receiving station can assume. These positions are mainly determined with the aid of a control E/R which in FIG. 4 is in the form of a change-over switch which applies a logic "1" to the input of a D-type flip-flop, denoted by 72, for the transmitting position and a logic "0" for the receiving position. In the receiving position a distinction is made between the active receiving position, that is to say the station is operative in accordance with the high-speed skip-law, and the stand-by position in which the station operates in accordance with the low-speed skip law, the change from the low-speed skip-law to the high-speed skip law being initiated when the signal SYN takes the value "1". The clock input of the flip-flop 72 receives the signal FA. The signal Em which appears at the output Q of the flip-flop 72 controls more specifically the positions of the change-over switches 16, 22 and the interruptor 24, the signal $\overline{Em}$ at the output $\overline{Q}$ of the flip-flop 72 is inter alia utilized to process on the one hand the signal RA which, when it has the value "1", indicates that the station is in the active receiving position and on the other hand the signal VE which, when it has the value "1", indicates that the station is in the stand-by position. The signal RA is processed by means of an AND-gate 74 which at one of its input receives the signal $\overline{Em}$ and at the other input the signal SYN, whereas the signal VE appears at the output of a further AND-gate 76 which receives at one of its inputs the signal $\overline{Em}$ and at its other input the signal $\overline{SYN}$.

The first requirement imposed is that, when the station changes to the transmitting mode, the code which must be applied to the inputs 50 at the subsequent leading edge of the signal FA is the code which would be transmitted if the station were to remain, during starting of the generator 55, in the transmitting position. The second requirement is that from the instant at which the synchronizing word is received (which, in principle, occurs only in the centre channels) the receiver must be adjusted to the listening mode in the subsequent channel after the centre channel and thus change to the high-speed skip law.

According to the invention, to satisfy these requirements a memory arrangement 100 has been provided to which there are connected a writing circuit 110 for the purpose of entering the codes produced by the generator 55 into the memory at the rate of the high-speed skip law and a read circuit 120 for taking from the memory the code intended to fix the frequency channel as a function of the position of the transmitting-receiving station and the reception of the synchronizing code.

The write circuit 110 which produces the write address codes WADR is comprised of a counter 122 each of whose counting positions each correspond to an address of the memory 100. These addresses are represented symbolically by $ad_{-2}$, $ad_{-1}$, $ad_0$, $ad_{+1}$, $ad_{+2}$. The counter 122 is incremented by one at each ascending edge of the signal FA. From this signal FA the short pulse WE in question is processed, within the time base 60, for on the one hand adjusting the memory 100 to the writing state and on the other hand for connecting its address code input 150 to the parallel output of the counter 122 via a change-over switch 155. The data to be stored are available on a multi-wire line BUSD which interconnects the output of the generator 55, the data entrance of the memory 100 and the inputs 50 of the synthesizer 20. As the output of the generator 55 is a three-state output the data are transmitted over the line BUSD when the pulse WE is active. The codes produced by the generator 55 are sequentially arranged in the memory 100 in the following way:

The code D0 is stored at the address ad0

The code $D_{+1}$ is stored at the address $ad_{+1}$.

The code $D_{+2}$ is stored at the address $ad_{+2}$.

The code $E_{-2}$ is stored at the address $ad_{-2}$.

The code $E_{-1}$ is stored at the address $ad_{-1}$.

The code E0 is stored at the address ad0 and so forth.

Figure 5:
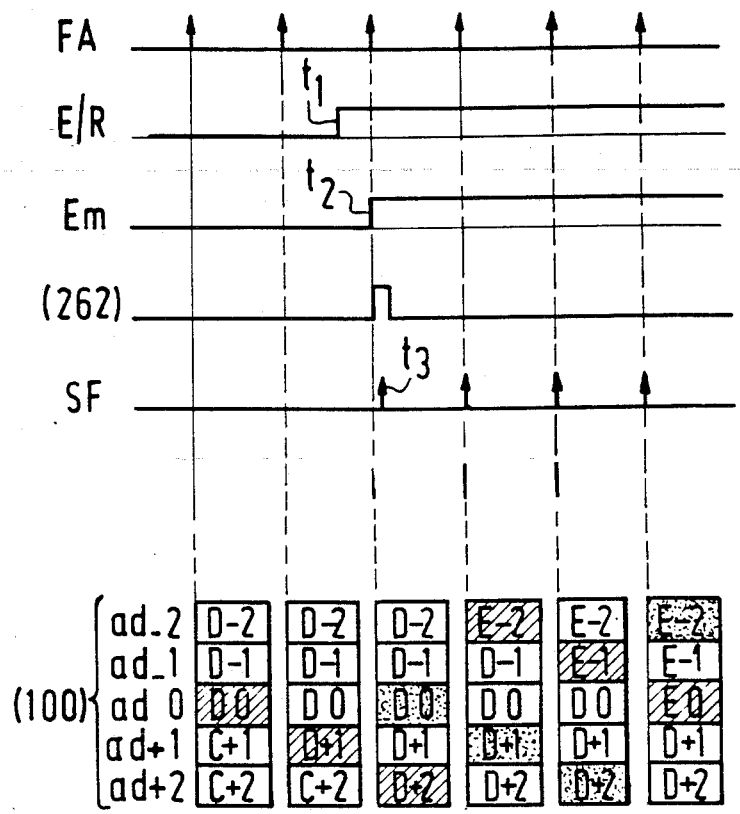
FIG. 5 is a time diagram illustrating the mode of operation of a transmitting-receiving station according to the invention which changes from the stand-by mode to the transmitting mode.
Figure 6:
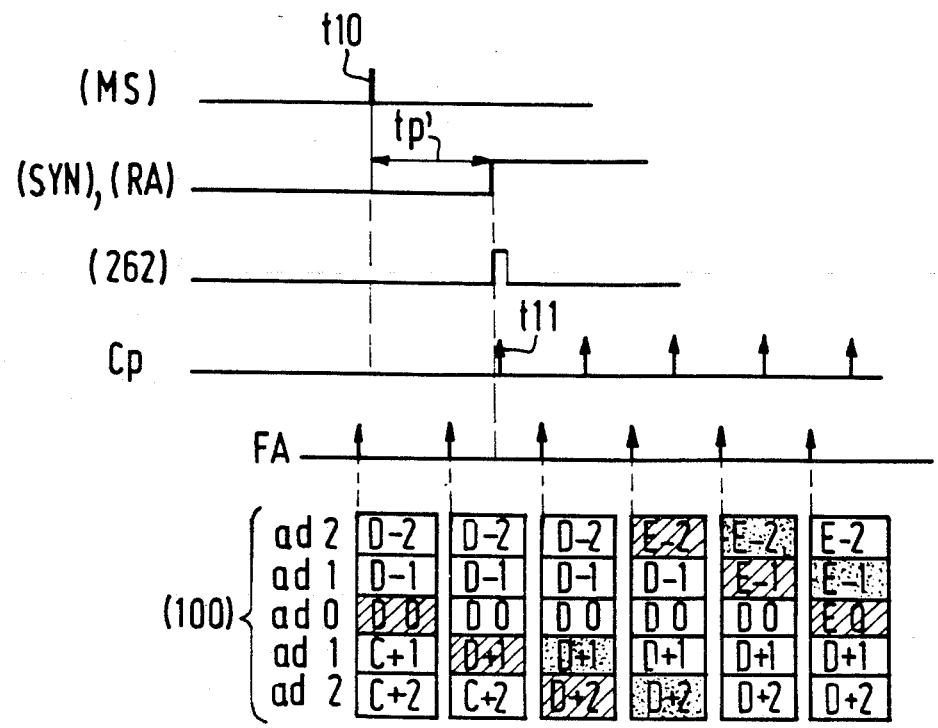
FIG. 6 is a time diagram illustrating the mode of operation of a transmitting-receiving station according to the invention which changes from the stand-by mode to the receiving mode.

In FIGS. 5 and 6 the line (100) represents the memory locations with the codes they contain. The hatched boxes indicate writing of a new code.

The read circuit 120 which produces a read address code RADR comprises a register 200 which permanently contains the address code ad0, that is to say the address of the centre channel. This code is switched by a change-over switch 222 to the position "ve" before it is applied to the input 150 of memory 100. Thus the listening channel is always the centre channel, so that the transmitting-receiving station is in the stand-by position with the low-speed skip law. When the transmitting-receiving station is in the receiving position, the listening channels satisfying the high-speed skip law, or when it is in the transmitting position, the read code is supplied by a counter 250; when the transmitting-receiving station is in the transmitting position this counter is incremented one step at each active edge of the signal FA and when it is in the receiving position (high-speed skips) the counter is incremented by one step at each ascending edge of a signal Cp which will be described hereinafter, this choice being effected with the aid of a change-over switch 252 which is controlled by the signal Em. When the station is in the transmitting position, a relation between the write address code and the read address code is imposed. To that end the counter 250 is started when the signal Em changes to "1"; the code WADR is reduced by two units with the aid of a subtracting element 255; thereafter this code is applied to the parallel inputs of the counter 250 by means of a change-over switch 260, which is adjusted to the position "em" by the signal Em when this signal assumes the value "1". A pulse shaper 262 applies a pulse to the load commandinput of the counter 250. This load pulse is triggered when the value of the signal Em transmitted by an "OR" gate 265 changes from "0" to "1".

The read circuit 120 comprises a further register 270 which contains the address code "ad1"; this code is intended to be loaded in the counter 250 when the change-over switch 260 is in its other position and when the output pulses of the pulse shaper 262 is triggered when the signal RA changes to "1".

Finally, the transmitting-receiving station shown in FIG. 1 comprises a threshold management circuit 300 which cooperates with the time base 60. This management circuit is comprised of a counter 305 which has a counting signal input connected to the output of an "AND" gate 307 and a reset-to-zero input connected to the output of an "OR" gate 310. The signal Cp is supplied from the output of this gate 310. Four decoders 311, 312, 313, 314 are associated with this counter 305. The decoder 311 produces the signal SF for a minimum content; the decoder 312 produces an active signal when the counter 305 reaches its maximum position; the frequency of the incrementing signals being such that the duration required by the counter 305 to reach its maximum position starting from its initial position corresponds to the time Tp; the decoder 313, used in a modification of the invention, produces a signal TM whose change to the active state must correspond to the change to the active state of the signal MS, and the decoder 314 produces an active signal corresponding to the end of the waiting time Tg. This latter signal is applied to the input S of an RS flip-flop denoted by 320, whereas the input R is connected to the output of the "OR" gate 310. The signal BL which opens the interruptor 26 during Tg and closes it thereafter, is taken from the output of the flip-flop 320. The output of the decoder 312 is connected to the input of an "AND" gate 322 which has two inputs, the other input of which receives the signal VE via a logic signal inverter 323 and also to the input of an "AND" gate 324 which also has two inputs, the other input of which directly receives the signal VE. The output of the gate 322 is connected to one of the two outputs of the "OR" gate 310, whereas the output of the gate 324 is connected to one of the two outputs of the gate 307 via a logic signal inverter 327. The other input of the gate 307 is connected either directly to the output of the time base 60 to receive a signal FT in accordance with a first variation 1 of the invention, or to the output of a control circuit 350 in accordance with variation 2 of the preferred embodiment of the invention, already mentioned above. This circuit 350 will be described in the further course of the description. In addition to the signal received from the gate 322, the "OR" gate 310 receives a signal coming from a pulse shaper 352, which is triggered by the output signal of a three-input "OR" gate 354. One of these inputs receives the signal Em, the second the signal RA and the third the output signal from a gate 355, one of whose two inputs receives the signal VE and the other a signal A0 processed by a decoder 360 connected to the counter 122. This decoder 360 produces an active signal at the appearance, inside the counter 122, of the address code "ad0".

There now follows a description of the mode of operation of the transmitting-receiving station according to the invention. To that end reference is first made to FIG. 5 which illustrates the case in which, from the stand-by position the control E/R is operated to make the change to the transmitting position.

In the stand-by position the change-over switch 222 is in its "ve" position, so that the code RADR is the code "ad0" contained in the register 200, the continuous code in this location of memory 100 is validated by the signal SF which appears at the beginning of the waiting time Tg; in the stand-by position, this waiting time will only appear at each code change in the address "ad0". This change, which is detected by decoder 360 produces via the gates 355, 354, the pulse shaper 352 and the gate 310 a reset-to-zero pulse for the counter 305 and causes the flip-flop 320 to be reset to zero. The counter 305 counts fast pulses from the time base 60, thereafter the signal SF appears which validates the new code coming from the location "ad0" of the memory 100 for the synthesizer, thereafter the counter is adjusted to a counting position corresponding to time Tg, the flip-flop 320 is adjusted to the "1" state which causes the interruptor 26 to close. Finally, the counter reaches its maximum position, it is then blocked since on the one hand the gate 322 is closed as a result of which the gate 310 cannot supply reset-to-zero pulses and on the other hand the gate 307 is also closed by the output signal of the inverter 327, which is indicative of the fact that the station is in the stand-by state and that the counter 305 is in its maximum position. To unblock the counter it is therefore necessary to await the next appearance of the signal A0.

If one wants to change to the transmitting state, the control E/R is operated such that an "1" is applied to the D input of the flip-flop 72; as can be seen in FIG. 5 this operation takes place at the time "t1", the ascending edge of the signal FA which then follows induces at the time "t2" the value "0" to change to the value "1" of the signal "em", which has for its effect that the change-over switch 260 is adjusted to the positions "em" and that the position of the change-over switch 222 is changed and, above all, that the load pulse produced by the circuit 262 for the counter 250 is triggered. On the other hand the change of the signal em to the "1" state triggers inside the threshold level management circuit the pulse shaping circuit 352, which causes the counter 315 to be reset to zero and the signal BL to be adjusted to the active state; the counter 305 starts counting and soon produces the signal SF, which validates at the instant t3 the output code of the memory 100 corresponding to the address contained in the counter 250; this address is defined by the code contained in the counter 122 decreased by two unit steps and thereafter transferred to the counter 250 by the pulse produced by the shaper 262. This decrease is effected "modulo 5", which corresponds to the number of locations of memory 100. Referring to line (100), the progress of the writing and reading operations of the memory 100 is shown. Just before the instant t1 the code $D_{+1}$ is written into the memory 100; the fact that the station is adjusted to the transmitting state does not disturb in any way whatsoever the writing cycle of the memory. In contrast therewith, at the instant t3 at which the active transition of the signal SF appears the code D0 is read as it is at the address "ad0", which the write code was "$ad_{+2}$". The counter 250 will be incremented at the next change to zero (signal Cp) of the counter 305 and the code $D_{+1}$ will be read at the location "$ad_{+1}$". The procedure then continues in the same way. It will be obvious that the code which governs the frequency of the synthesizer 20 is delayed systematically by two codes relative to the code generated by the generator 55.

Now the case will be considered in which the transmitting-receiving station changes from the stand-by state to active reception, that is to say from the moment the word MS is received. This case will be described in detail with reference to FIG. 6.

Let it be assumed that at the instant t10 the synchronizing word is contained in register 40, which is detected by the decoder 42; this delayed pulse of duration Tp' adjusts the signal SYN to the logic "1" state and consequently also the signal RA. The pulse shaper 262 causes the counter 250 to be loaded so that it contains the code "ad1" coming from register 270. In addition, the counter 305 is adjusted to zero which causes the occurrence of the third pulse Cp at the instant t11 (FIG. 6). Although the counting input of the counter 250 receives the signal Cp via the change-over switch 252, this first pulse Cp does not influence the content thereof, the loading control having priority over all other actions. But this pulse Cp for setting the counter 305 to zero causes, somewhat later the pulse SF to appear, which validates the output code of the memory 100, this code being situated at the address $ad_{+1}$. Thereafter the pulse from the pulse shaper 262 disappears, the next pulse Cp will increment the counter 250. By means of a dotted line, FIG. 6 shows, as does also FIG. 5, the boxes of the codes read whereas the boxes of the written-in codes are hatched. At each ascending edge of the signal FA a code from generator 55 is written-in and at each signal SF a code supplied by the memory 100 is validated for the synthesizer 20.

Figure 7:
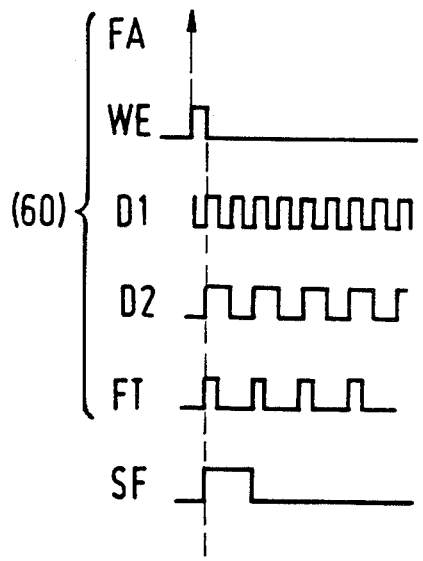
FIG. 7 shows the shape of some signals used to fix the writing and reading periods of the memories which are part of the transmitting-receiving station of FIG. 4.

FIG. 7 shows the shape of the signals produced by the time base 60. These signals, which are all periodic signals, are processed from a high frequency signal D1, which is equal to or higher than a multiple of the frequency at which the binary elements appear. After division by two, the signal D2 is obtained from D1 and thereafter the signal FT is realized as, for example, FT=D1.D2. The signals FA and WE have periods which are equal to the duration of the threshold period, the width of the time period in which WE is active is equal to half the period of the signal D1 and this signal is active when D1=0. It should be noted that the signal SF occurs only at an ascending edge of the signal FT, which causes the threshold counter 305 to be incremented, and consequently that the active transition does not occur until D1 is equal to "1"; in this way it is ensured that reading and writing the memory 100 simultaneously is realized without any problem.

Figure 8:
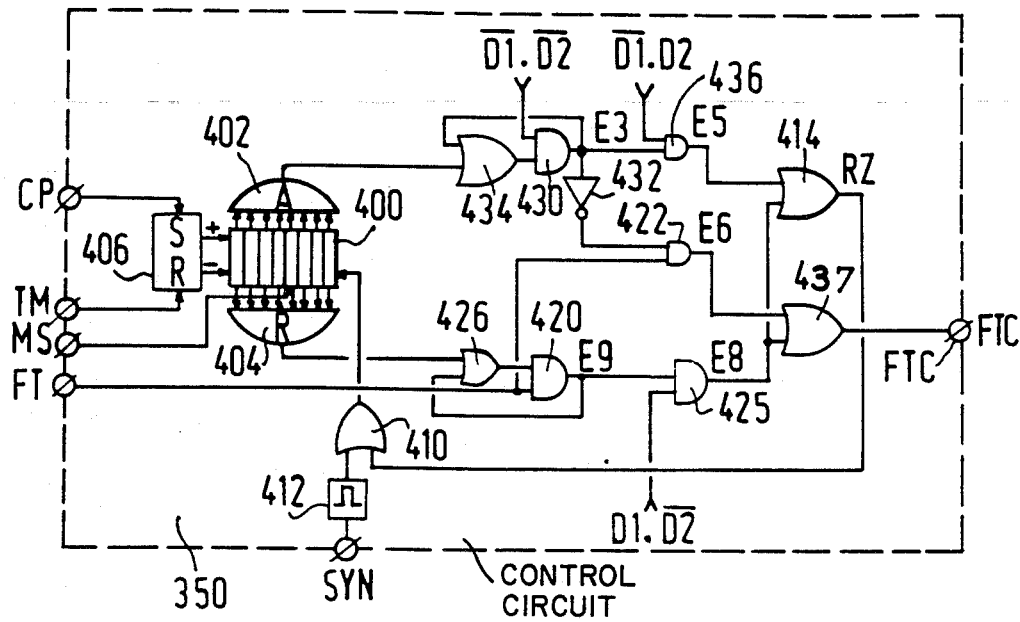
FIG. 8 shows the arrangement of the control circuit which, in accordance with a variation of the invention, is part of the transmitting-receiving station of FIG. 4.

FIG. 8 shows in detail the construction of the control circuit 350. This circuit modifies the rate of the counting signals of counter 305. This modification is based on the instant at which a specific code appears in the transmission time of a channel. Within the scope of the example described, this code is the code MS utilized already in the foregoing, this code MS must be recognized at the time TM counted from the beginning of the threshold. This time TM is determined in the transmitting-receiving station with the aid of decoder 313; the control circuit 350 consequently has for its object to ensure that there is coincidence in the time between the appearance of the signal MS and the appearance of the output signal TM of the decoder 313.

This control circuit 350 is formed from an up/down counter 400 to which two decoders 402 and 404 are connected; the decoder 402 produces a signal A which, being an active signal, indicates that MS appears prior to TM; the decoder 404 produces a signal R which, being an active signal, indicates that MS lags behind TM.

The up/down counter 400 can be adjusted to the counting-up or the counting-down position by the output signal of a flip-flop of the RS type, which is denoted by reference numeral 406. The signal "1" of this flip-flop adjusts the up/down counter 400 to the counting position and the signal "0" adjusts it to the down-counting position. The flip-flop 406 is set to the "1" state by the signal Cp and to "0" by the signal TM. The signal MS is applied to the up/down counting input to increment the up/down counter by "+1" or "−1", according as it is in the up-counting or in the down-counting state. The up/down counter 400 can be adjusted to zero by the output signal of an "OR" gate 410 one of the two inputs of which receives the output signal from a pulse shaper 412 and the other a signal RZ. The input of the shaper 412 receives the signal SYN; the signal RZ comes from an "OR" gate denoted by reference numeral 414.

The signal FT to which one wants to add a pulse or subtract a pulse according to whether the signal A or the signal R is generated is applied to one of the two inputs of a gate 420 and also to one of the two inputs of a gate 422. The other input of the gate 420 is connected to the output of an "OR" gate 426 one of the two inputs of which is connected to the output of the gate 420 and the other to the output of the decoder 404. The other input of the gate 422 is connected to the output of an "AND"-gate 430 via a logic signal inverter 432. One of the two inputs of the gate 430 is connected to the output of an "OR"-gate 434 which has two inputs. One of these inputs is connected to the output of the gate 430, the other to the output of the decoder 402. The output of the gate 430 is connected to one of the inputs of an AND-gate 436, whose output is connected to one of the two inputs of the gate 414. An "OR"-gate 437 having two inputs produces the signal FTC which is the corrected signal FT which, in accordance with this variant II is applied to the incrementing input of the threshold counter 305. The second inputs of the gates 414 and 420 are connected to the output of an AND-gate 425 one of whose inputs is connected to the output of the gate 420. The second input of the gate 437 is connected to the output of the gate 422. Different signals occurring during operation of the control circuit are supplied by the time base 60. They are the signals:

D1.D2 which are applied to the second input of the gate 430;
D1.D2 which are applied to the second input of the gate 436
D1.D2 which are applied to the second input of the gate 426.

To explain the mode of operation of the control circuit the following signals are used:
E3 output signal of the gate 430
E5 output signal of the gate 436
E8 output signal of the gate 425
E9 output signal of the gate 420.

Figure 9:
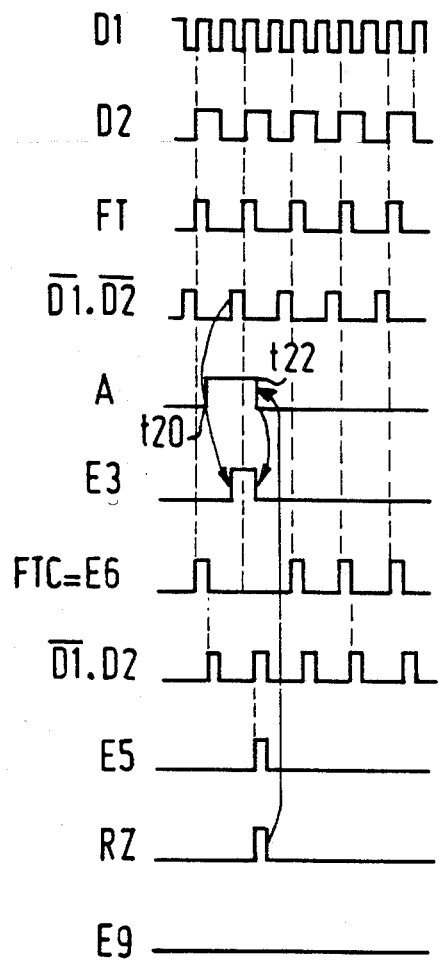
FIGS. 9 and 10 are time diagrams to explain the mode of operation of the control circuit for the case in which signals must be supplied at a lower and a higher rate, respectively.
Figure 10:
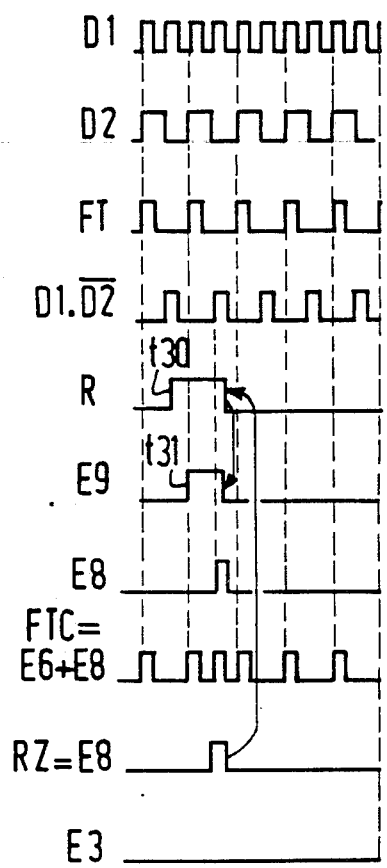

FIG. 9 shows the case in which the signal A assumes the value "1" at the instant t20. This has for its effect that the assembly formed by the gates 430 and 434 is rendered conductive so that the ascending edge of the signal D1.D2 is transmitted via the gate 430. The signal E3, which is the output signal of the gate 430 opens the gate 436 so that the subsequent pulse of the signal D1.D2 is transmitted, via the gates 436, 414 and 410, as a result-to-zero pulse for the up/down counter 400 (signals E5 and RZ). The signal A then assumes the value "0" at the instant t22, which results in the signal E3 also having the value "0". The assembly formed by the gates 430 and 434 is rendered nonconductive and the signal D1.D2 is no longer transmitted. During the period of time in which E3 had the value "1" the gate 422 was blocked; thus the signal FTC (FTC=E6) has one pulse less than the signal FT. It should be noted that during all these operations the signal E5 has the value "0" and does not occur in this case. This situation changes when the signal R assumes the value "1" (see FIG. 10) at the instant t30, which causes the signal E5 to obtain the value "1" at the instant t31 at the subsequent ascending edge of the signal FT. As the signal E9 has the value "1", the gate E8 transmits a reset-to-zero pulse for the up/down counter 400 via the gates 414 and 410 and inserts an additional pulse into the pulses FT. In this case FTC=E6+E8. It should be noted that E3 continues to have zero value.

What is claimed is:

1. In a transmitting-receiving system for transmitting data by frequency-hopping, comprising a code-generator for defining the use of a plurality of channels in accordance with a high-speed skip law in a transmitting mode or in a receiving mode and in accordance with a low-speed skip law in a stand-by mode, the high-speed skip law consisting in the sequential separate use of each of the channels for duration Tp, while the low-speed skip law governs the changes of the receiving channels employed during N×Tp, each corresponding to a determined center channel of a sequence of N channels of said high-speed skip law, the center channel having a synchronizing code; the improvement wherein the system comprises a memory, a write circuit connected to the memory and generator for progressively storing the codes in the memory received from the generator, and a read circuit connected to the memory for reading the codes stored therein as a function of the position to which the transmitting receiving system has been adjusted.

2. The transmitting receiving system of claim 1 wherein the memory comprises a direct access memory having a capacity of N codes, and the write circuit comprises a modulo-N counter connected to be incremented by each code supplied by the code generator.

3. The transmitting receiving system of claim 2 wherein the read circuit comprises means for reading a code in the transmitting mode having an address in the memory defined by the code of the modulo-N counter in accordance with a determined relation, means for reading a code in the stand-by mode from a code address defining the center channel, synchronizing code recognizing circuit means connected to recognize the synchronizing code of the center channel, and means for reading the code in the receiving mode from the address one unit higher than the address of the center channel, at the moment an output signal from the synchronizing code recognizing circuit appears, and for thereafter sequentially reading the codes in the consecutive addresses of the memory.

4. The transmitting-receiving system of claim 3 further comprising a threshold management circuit including a time counter for setting the different time periods during channel usage and having a start control connected to cooperate with the synchronizing code recognizing the circuit.

5. The transmitting-receiving system of claim 1 for a transmission system in which a waiting time is provided between each change of channels and including a channel determination oscillator connected as a first oscillator for the receiving mode and a pilot oscillator for the transmitting mode, further comprising means for blocking the output signal of the channel determination oscillator, the threshold management circuit being connected to actuate the blocking means during the waiting period.

6. The transmitting-receiving system of claim 4 further comprising a control-circuit connected to apply signals at a variable rate to the time counter of the threshold management circuit, and comparison means for comparing the time at which a predetermined code appears which was received during use of the channels and at a time of appearance anticipated by the time counter, and means coupled to said control circuit for controlling said rate so that these two times correspond to each other.

* * * * *